June 15, 1937.　　　　G. BALLARD　　　　2,083,631
NONSKID DEVICE FOR MOTOR VEHICLES
Filed March 20, 1936　　　2 Sheets-Sheet 1
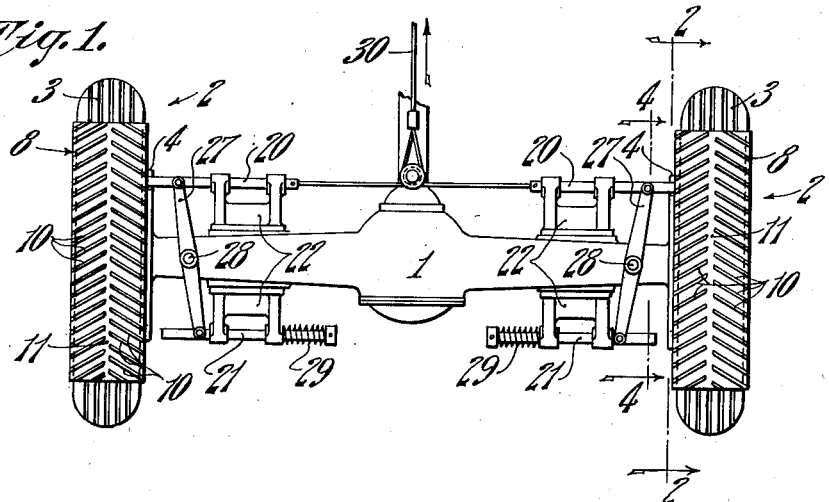
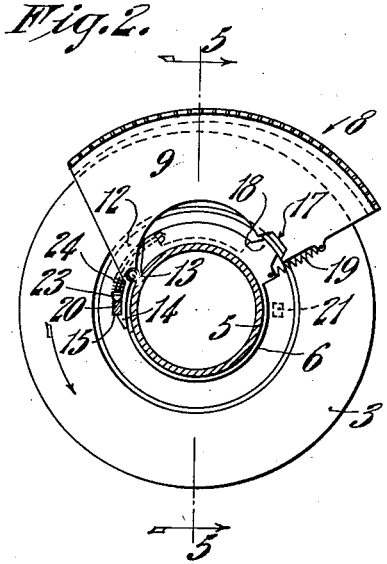
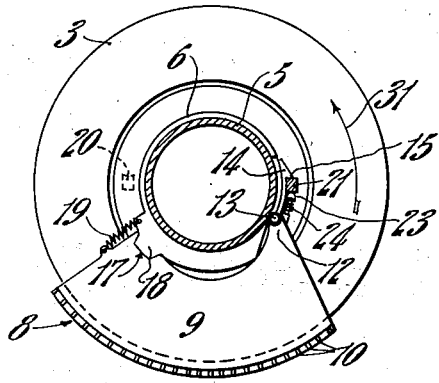
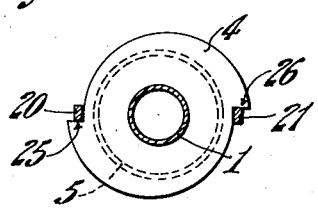
INVENTOR,
George Ballard,
BY
Harry W. Bowen.
ATTORNEY.

June 15, 1937.   G. BALLARD   2,083,631
NONSKID DEVICE FOR MOTOR VEHICLES
Filed March 20, 1936   2 Sheets-Sheet 2

INVENTOR,
George Ballard,
BY Harry W. Bowen.
ATTORNEY.

Patented June 15, 1937

2,083,631

UNITED STATES PATENT OFFICE 2,083,631

NONSKID DEVICE FOR MOTOR VEHICLES

George Ballard, Springfield, Mass.

Application March 20, 1936, Serial No. 69,941

6 Claims. (Cl. 188—4)

This invention relates to non-skid devices for motor vehicles, and has for an object the interposition of an immovable road-gripping member between one or more of the wheels of a motor vehicle and the road, or other surface with which the wheels are normally engaged.

Other objects of the invention are the provision of means for positively supporting and retaining the road-gripping member in both its operative and inoperative positions and convenient and practical means for controlling and operating the retaining devices.

These, and other objects and advantages of this invention will be more completely disclosed and described in the specification, the accompanying drawings, and the appended claims.

Broadly, my invention comprises a hood member provided with ribs, or projections, on its outer surface, which member is pivotally, or rotatably, supported on the axle of a motor vehicle wheel, and normally held suspended above and clear of the wheel, means for releasing this hood member from this position and bringing it into engagement with the wheel, whereby the revolution of the wheel will carry the hood member circumferentially of the wheel, until it becomes interposed between the wheel and the surface of the ground, means for locking the hood member in the latter position, and means for releasing the locking means, whereby engagement of the wheel and hood will return the hood to its normal suspended position, above the wheel.

A preferred embodiment of this invention is illustrated in the accompanying drawings, in which:—

Fig. 1 is a plan view of an axle and opposite wheels of a motor vehicle, with the invention installed thereon.

Fig. 2 is a sectional view, taken on the line 2—2 of Fig. 1, showing the invention in inoperative position.

Fig. 3 is a view similar to Fig. 2, showing the device in operative position.

Fig. 4 is a sectional view, taken on the line 4—4 of Fig. 1.

Referring now to the drawings in detail, in which like numerals refer to like parts throughout:—

Figure 5:
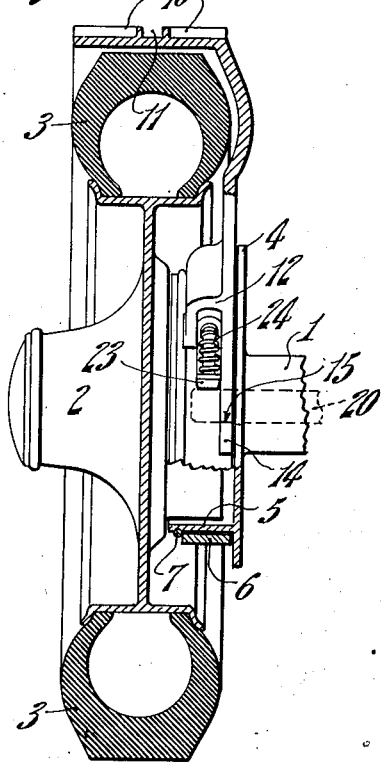
Fig. 5 is a sectional view, taken on the line 5—5 of Fig. 2.
Figure 6:
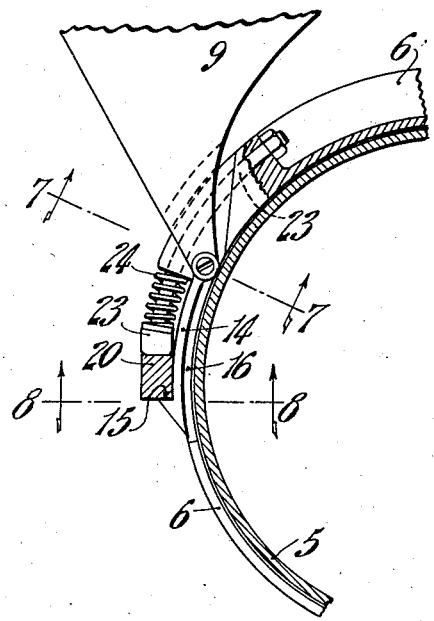
Fig. 6 is a detail view of the holding latch.
Figure 7:
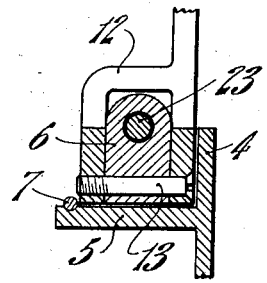
Fig. 7 is a cross sectional view, taken on the line 7—7 of Fig. 6.
Figure 8:
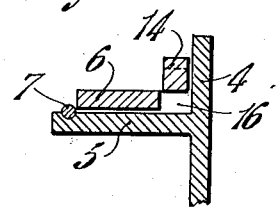
Fig. 8 is a cross sectional view, taken on the line 8—8 of Fig. 6.

A motor vehicle axle, or axle housing 1, on which are supported, in the usual manner, wheels 2, carrying tires 3, is provided with flange members 4 on each of which is formed a drum 5. A ring member 6 is rotatably supported on the drum 5 between the flange 4 and a locking ring 7. An arc-shaped hood plate 8, formed with a radial, side flange portion 9, is provided on its outer surface with a plurality of parallel ribs, or projections 10, which are arranged at an angle with the sides of the member 8, and on either side of a central channel 11. The channel 11, in co-operation with the ribs 10, provides space for clearing the hood plate 8 of mud, snow, ice, or other foreign substances which may collect thereon. The flange 9 is provided with an offset or clevis portion 12 which is pivotally secured to the ring 6 by a bolt, or stud 13. The clevis 12 is extended to provide a latch 14, having a latching shoulder 15. The ring 6 is notched at 16, (Figs. 6 and 8), to permit movement radially of the latch 14. The opposite end of the flange portion 9 of the hood plate 8 is formed with a notch 17 which, when sufficient pressure is exerted on the plate 8, is engaged and supported by a boss 18, formed on the ring member 5. A spring 19, secured to the flange 9 and the boss 18 of the drum 5, exerts a pull to bring the notch 17 of the flange 9 into engagement with the boss 18, and thus pull the hood plate member 8 down onto and into engagement with the tire 3. When the hood member 8 is locked in suspended position, as indicated in Fig. 2, the action of the spring 19 is negative by reason of the engagement of the latch 14 with a latch bar 20, which causes the hood member 8 to pivot on the stud 13, thus raising the member 8 clear of the tire 3. There is sufficient spring in the latch 14 to permit engagement of the bar 21 when the hood 8 is held between the ground and the tire 3, as indicated in Fig. 3. Engagement of the bar 21 on the cam surface of the latch 14 will force the latch into the opening 16 in the flange 6, the latch 14 being at the time sprung between the cammed end and the pivot point 13. A pair of oppositely disposed latch bars 20 and 21, slidably supported in bearings 22, on the housing 1, cooperate with the latch 14 to hold the hood plate 8 in operative and inoperative positions. These latch bars 20 and 21, when in operative position, are located between the shoulder 15 on the latch 14 and a bumper 23, slidably supported in the ring 6. A compression spring 24 absorbs the initial shock of engagement of the revolving latch 14 on the hood member 8, with either of the latch bars 21 or 20. The latch bars 20 and 21 are supported in operative position on shoulders 25 and 26, (Fig. 4), on the flange 4 of the housing 1. The latch bars 20 and 21 are connected for movements in opposite directions by a two-arm link 27, pivotally supported on the housing 1 at 28. A compression spring 29, on the bar 21, exerts a force to normally hold the bar 21 in inoperative position and the bar 20 in operative position, as indicated in Fig. 1 and Fig. 2. The action of the spring 29 is opposed by a cable 30, which may be connected to any suitable operating means, (not shown), which is readily accessible to a driver of the motor vehicle. Under all ordinary operating conditions, the spring 29 holds the latch bars 20 in operative position, thus maintaining the hood plate 8, suspended in inoperative position, as indicated in Fig. 2. A pull on the cable 30 reverses the positions of the lock bars 20 and 21, thereby holding the hood plate 8 in operative position, as indicated in Fig. 3. If desired, the cable 30 may be held in a neutral position, in which position both latch bars 20 and 21 would be withdrawn from engagement with the latch 14, thus permitting revolution of the hood member 8 with the tire 3. The action of the hood plate 8 is as follows:—When the latch bar 20 is withdrawn and the latch bar 21 advanced into operative position, the spring 19 draws the hood plate 8 down into engagement with the tire 3. Revolution of the tire 3 then carries the plate 8 downwardly, until it contacts the ground. Continued revolution of the wheel 2 causes the plate 8 to be inserted between the tire 3 and the ground, as indicated in Fig. 3. When the plate 8 reaches this position, engagement of the latch bar 21, between the latch 14 and bumper 23, prevents further revolution of the plate 8 and holds the same immovable, thus providing an immovable contact of the motor vehicle with the ground. As the plate 8 is approximately flat in cross section, as indicated in Fig. 5, this contact is extended over a considerable area, relative to the normal contact of the tire with the ground. Thus, the motor vehicle, by means of a pull on the cable 30, becomes instantaneously locked to the ground, through the plates 8, latch bars 21, flanges 4, and housing 1. Withdrawal of the latch bars 21 and simultaneous advancement of the latch bars 20, into operative position, permits the plate 8 to be carried rearwardly and upwardly, by contact with the tire 3, as indicated by an arrow 31, in Fig. 3, until contact with the latch bars 20 again locks the plate 8 in suspended and inoperative position.

What I claim is:—

1. In combination, in a non-skid device, a hood member, means for normally retaining the same in a non-operative position above and out of contact with a motor vehicle wheel, means for releasing the retaining means, means for moving the hood member into contact with the motor wheel for carrying the said member into a position between the said wheel and the roadway surface and means for retaining the hood means in this lowered position, said two retaining means for the hood member comprising a fixed flange member having shoulder portions, latch bars engaging the shoulder portions, and latch means on the hood member engaged by the latch bars for releasing the hood member and for stopping the movement of the hood member after being released.

2. In a non-skid device for motor vehicles, a hood member normally retained above the wheel, spring means for causing the hood member to be moved with a motor vehicle wheel into a position between the said wheel and the roadway, and latch means connected to the hood member for causing the hood member to be moved from said position above and out of contact with the wheel.

3. A non-skid member for a motor vehicle wheel, an arc-shaped member associated with said wheel, a flange having shoulders connected to the wheel, bar means engaging the shoulders for normally retaining the member above and out of contact with the wheel, means for releasing the bar retaining means, and spring means for moving the arc-shaped member into contact with the wheel for movement therewith, and additional shoulder and bar means for stopping and retaining the said member in a position between the wheel and the roadway and assuming the weight carried by the wheel, the outer surface of the arc-shaped member having grooves that are self-cleaning.

4. In combination with a wheel of a motor vehicle, a non-skid member comprising an arc-shaped member normally located above the wheel and out of contact therewith, reversible latch bars, means for operating the same, a flange member having shoulder portions with which the latch bars alternately engage, one of the shoulders serving to retain the non-skid member elevated and the other shoulder serving to retain the non-skid member lowered and between the wheel and the roadway.

5. In combination with a wheel of a motor vehicle, a non-skid member comprising an arc-shaped member normally located above the wheel and out of contact therewith, reversible latch bars, means for operating the same, a flange member having shoulder portions with which the latch bars alternately engage, one of the shoulders serving to retain the non-skid member elevated and the other shoulder serving to retain the non-skid member lowered and between the wheel and the roadway, and said latch bars, when disengaged from both of the shoulder portions, permitting the non-skid member to continuously rotate with a wheel of the motor vehicle.

6. In combination, in a non-skid device, a hood member, flange means having shoulder portions, bars engaged by the shoulders for normally retaining the hood member in a non-operative position above and out of contact with a motor vehicle wheel, means for releasing the retaining bar means, spring means for moving the hood member into contact with the motor wheel for carrying the said member into a position between the said wheel and the roadway surface and additional shoulder means on said flange means for retaining the hood means in this lowered position.

GEORGE BALLARD.